United States Patent
Sathish (10) Patent No.: US 8,584,208 B2
(45) Date of Patent: Nov. 12, 2013

(54) METHOD AND APPARATUS FOR PROVIDING A CONTEXT RESOURCE DESCRIPTION LANGUAGE AND FRAMEWORK FOR SUPPORTING THE SAME

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 572 days.

(21) Appl. No.: 12/625,755

(22) Filed: Nov. 25, 2009

(65) Prior Publication Data

US 2011/0126267 A1    May 26, 2011

(51) Int. Cl.
*G06F 7/04*    (2006.01)
(52) U.S. Cl.
USPC ............... 726/4; 726/3; 726/5; 726/6; 726/7; 713/165; 713/166; 713/167
(58) Field of Classification Search
USPC ...................................................... 726/4, 13
See application file for complete search history.

(56) References Cited

U.S. PATENT DOCUMENTS

| | | | |
|---|---|---|---|
| 7,512,965 B1* | 3/2009 | Amdur et al. ................... 726/1 |
| 2009/0055905 A1* | 2/2009 | Graveline et al. ............... 726/4 |
| 2009/0077383 A1* | 3/2009 | de Monseignat et al. ...... 713/175 |
| 2009/0112460 A1* | 4/2009 | Baker et al. .................... 701/208 |

* cited by examiner

*Primary Examiner* — Longbit Chai
(74) *Attorney, Agent, or Firm* — Alston & Bird LLP (57) ABSTRACT

An apparatus for providing a framework for supporting a context resource description language may include at least one processor and at least one memory including computer program code. The at least one memory and the computer program code may be configured to, with the at least one processor, cause the apparatus to perform at least receiving an indication of content loaded at a browser, parsing the content for context resource description language providing an identification of properties requested in association with a service from which the content was loaded, and providing property management with respect to the identified properties for provision to the service. A corresponding method and computer program product are also provided.

20 Claims, 4 Drawing Sheets

METHOD AND APPARATUS FOR PROVIDING A CONTEXT RESOURCE DESCRIPTION LANGUAGE AND FRAMEWORK FOR SUPPORTING THE SAME

TECHNOLOGICAL FIELD

Embodiments of the present invention relate generally to communication interface technology and, more particularly, relate to a method and apparatus for providing a framework for supporting a context resource description language.

BACKGROUND

Organizations such as the World Wide Web Consortium (W3C) have been actively seeking mechanisms by which to support consumers and providers in relation to granting consumers access to provider resources in present and future communication environments. In this regard, one aspiration of the activities focused in this arena is to provide a standardized and unified model for context access that can support mobile devices. However, smart spaces and other communication environments may present some challenges in relation to achieving the goal described above.

In a typical case in which a web page is loaded by the browser of a mobile device, the web page (or service associated with a particular web page) may be associated with or request a certain set of resources. If the resources are not available for some reason, the web page typically cannot provide the intended level of service. The inability to provide resources may be related, for example, to a security problem or the current context of the device, but regardless of the cause, it is typical that the reason for the failure to be able to provide the resources is unclear.

Accordingly, it may be desirable to provide a framework for addressing at least some of the issues discussed above.

BRIEF SUMMARY

A method, apparatus and computer program product are therefore provided for enabling the provision of a context resource description language and associated framework for supporting the same. The context resource description language may provide a model for provision of improved capabilities for mobile devices in current and future communication environments with respect to enabling the provision of resources associated with a particular page that is loaded or enabling fetching of alternative or adapted content from the server. In some cases, some embodiments of the present invention may further provide a model that enables certain settings impacting the model to be made by a consumer application.

In one example embodiment, a method of providing a framework for supporting a context resource description language is provided. The method may include receiving an indication of content loaded at a browser, parsing the content for context resource description language providing an identification of properties requested in association with a service from which the content was loaded, and providing property management with respect to the identified properties for provision to the service.

In another example embodiment, a computer program product for providing a framework for supporting a context resource description language is provided. The computer program product includes at least one computer-readable storage medium having computer-executable program code instructions stored therein. The computer-executable program code instructions may include program code instructions for receiving an indication of content loaded at a browser, parsing the content for context resource description language providing an identification of properties requested in association with a service from which the content was loaded, and providing property management with respect to the identified properties for provision to the service.

In another example embodiment, an apparatus for providing a framework for supporting a context resource description language is provided. The apparatus may include at least one processor and at least one memory including computer program code. The at least one memory and the computer program code may be configured to, with the at least one processor, cause the apparatus to perform at least receiving an indication of content loaded at a browser, parsing the content for context resource description language providing an identification of properties requested in association with a service from which the content was loaded, and providing property management with respect to the identified properties for provision to the service.

Embodiments of the invention may provide a method, apparatus and computer program product for employment in web based, or other network based operating environments. As a result, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Electronic devices have been rapidly developing in relation to their communication capabilities. As the capabilities of such devices have increased, applications that are sensitive to the capabilities of the devices have also been developed. Thus, for example, applications that are sensitive to the current operating state or context of devices have been developed. The devices are often able to determine, keep and communicate information about their own current operating state. For example, battery level, available bandwidth, certain device settings, hardware and software capabilities, local ambient light level and many other state related pieces of information may be determined and/or communicated to other devices. Some of the descriptive information about devices may be considered context information.

Context is generally defined as any information that can be used to characterize the situation of an entity. Context parameters may include parameters related to, for example, environmental context, social context, spatio-temporal context, task context, personal context, terminal context, service context, access context, and/or the like. Context may be used to describe a set of characteristics of a device, a network, user preferences and other aspects that may apply to an interaction between the device and an application (e.g., a web application). Aspects of context could be either static or dynamic. Static aspects may include color resolution, display size, keyboard arrangement or other fixed properties of the device. Dynamic aspects may include properties of the device that may change over time such as current battery level, device orientation, device location, other applications running, and numerous other characteristics.

In order to communicate information on device context to various applications such as, for example, an application associated with accessing the web, a context framework or model may be provided. Provision of such a model may alleviate or at least mitigate some of the issues described above. In particular, for example, if a web application requests a particular service (e.g., a global positioning system (GPS) service related to providing positioning updates) to provide routine updates regarding information, resources associated with the provision of the service (e.g., positioning resources) are expected to be requisitioned. However, device context may inhibit the ability to provide such resources. As such, some embodiments of the present invention may provide a model to create a framework for a context resource description language that may be used to support content adaptation in relation to provision of the resources. In this regard, some embodiments of the present invention may provide a model for utilization by content adaptors (e.g., on a server) to utilize the model to provide in-session content adaptation to enable content provision based on, for example, security constraints and device capabilities. The model may involve the embedding of a context resource request description written in a particular description language (e.g., a context resource description language) for processing by a client device.

Accordingly, for example, a client interface such as a Delivery Context Client Interface (DCCI) or similar W3C or other specification may be defined to enable context information to be made available to scripts running in web pages within a browser on a device to enable client based applications to interface with servers in an adaptive fashion to improve user experience and provide improved assurance for service provision within a particular session. Some embodiments may also enable consumer applications to make certain settings on the model. In relation to providing such settings, a mechanism may be provided by some embodiments via which to inform users as to reasons for which a particular setting may be needed or desired. Furthermore, some embodiments may address problems relating to preventing multiple services from changing settings involving model management and catering for atomicity (e.g., transaction based services).

Context may be determined, for example, based on a determination of various context parameters. The use of context information may enable adaptation that permits interaction with various applications while considering device context. In some cases, when devices are brought in proximity to each other in certain networks, such as smart spaces, context information, e.g. information regarding device capabilities, may desirably be shared between such devices so that each device can receive some information about the capabilities of the other device. Thus, embodiments of the present invention may provide a language and framework for support of such language for employment in connection with an application programming interface (API) having associated features and data structures to facilitate the provision of such information.

Figure 1:
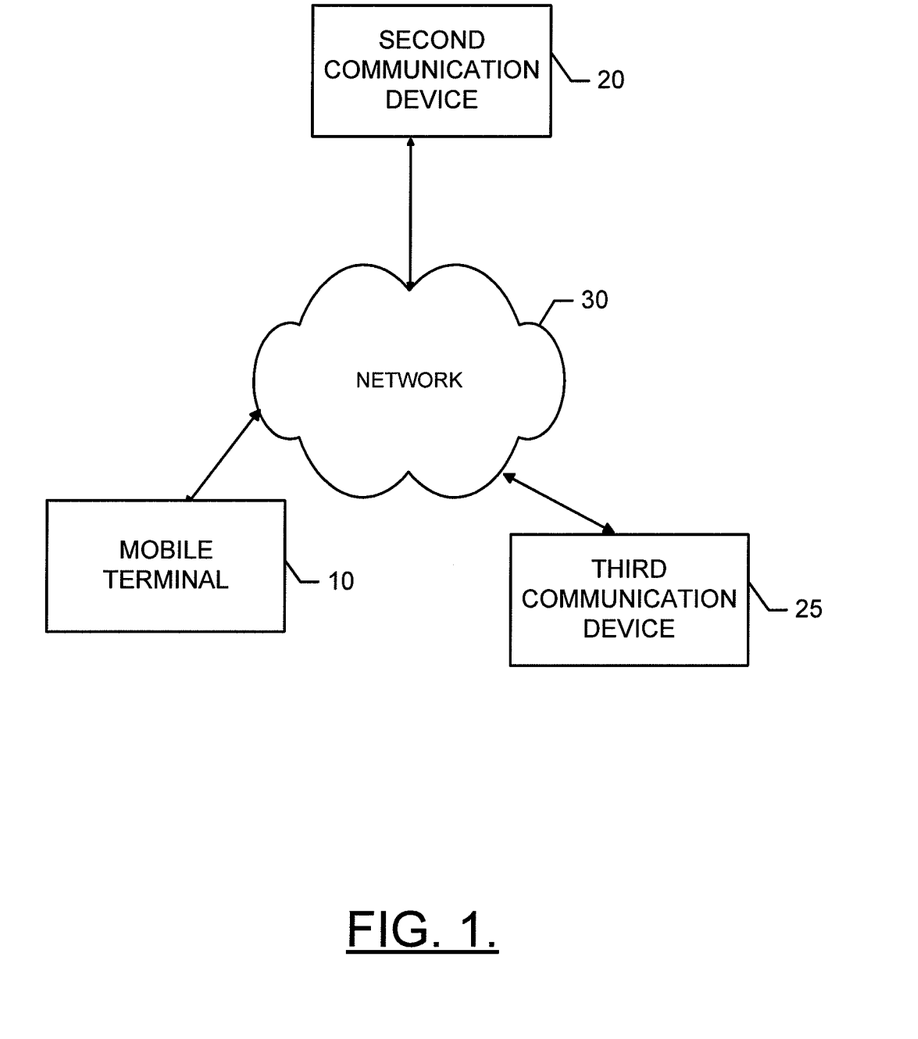
FIG. 1 is a schematic block diagram of a communication system according to an example embodiment of the present invention.

FIG. 1 illustrates a generic system diagram in which a device such as a mobile terminal 10 is shown in an example communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, GPS devices, or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. For example, in some cases, the second and/or third communication device 20 or 25 may be embodied as a server. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In some embodiments, the network 30 may be a P2P network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ a context framework to assist in providing support for a context resource description language used to define properties or resources associated with or otherwise needed by a particular service (e.g., a web page loaded by a web application or browser running on the mobile terminal 10 and acting as a consumer). As such, the context framework may support an interface between consumers (e.g., web applications) and providers (e.g., data providers in the form of network nodes such as the second and/or third communication devices 20 and 25). As such, for example, a consumer application may request information from a provider within the network 30 and any one of the mobile terminal 10 or the second and third communication devices 20 and 25 may host a consumer application while any other one of the mobile terminal 10 or the second and third communication devices 20 and 25 acts as a provider with respect to the consumer application to provide information such as context information to the respective consumer application.

Figure 2:
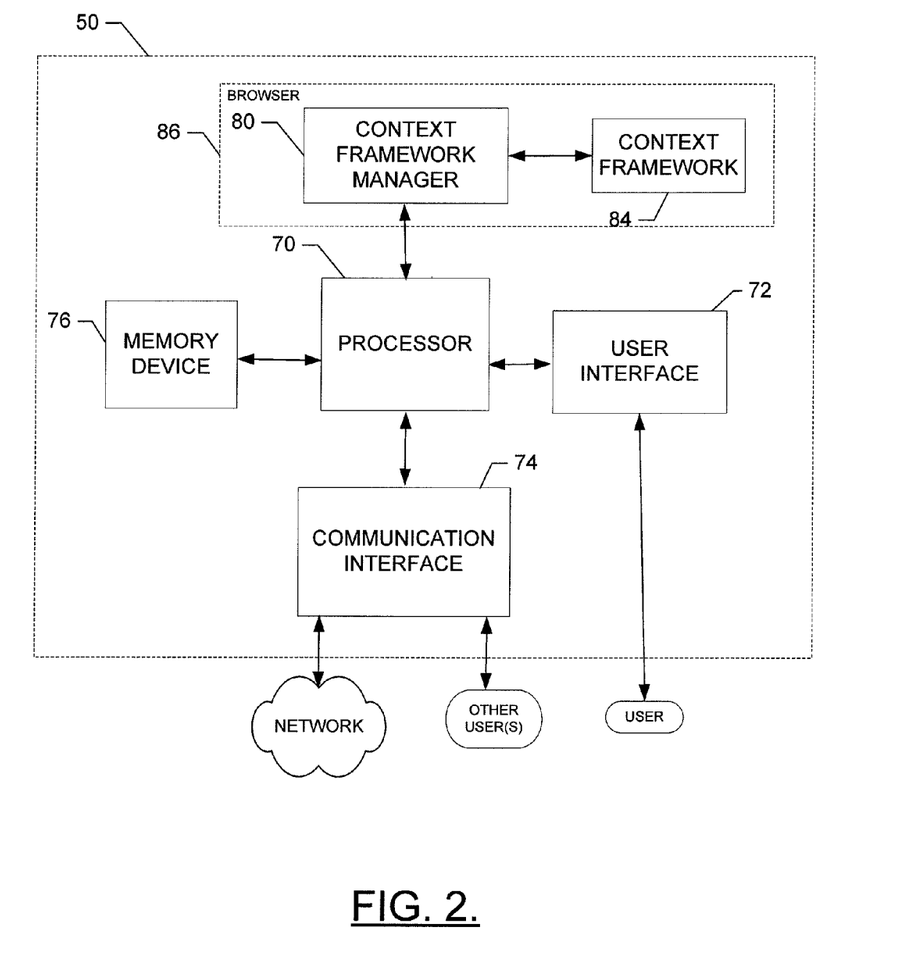
FIG. 2 is a schematic block diagram of an apparatus for providing a framework for supporting a context resource description language according to an example embodiment of the present invention.

FIG. 2 illustrates a schematic block diagram of an apparatus for enabling the provision of a context resource description language and framework for supporting the same according to an example embodiment of the present invention. An example embodiment of the invention will now be described with reference to FIG. 2, in which certain elements of an apparatus 50 for providing a context resource description language and framework for supporting the same are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 2, an apparatus 50 for providing a context resource description language and framework for supporting the same is provided. The apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates or other structure configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. In some cases, the processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control a context framework manager 80. The context framework manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the context framework manager 80 as described below. Thus, in examples in which software is employed, a device or circuitry (e.g., the processor 70 in one example) executing the software forms the structure associated with such means.

In an example embodiment, the context framework manager 80 may be configured to provide, among other things, for the provision of a context framework 84 that may be used to provide a transaction based model setting requirements for an application on a consumer or client device. In some examples, the context framework 84 may be a portion of a browser (e.g., shown in dashed lines as browser 86). Accordingly, for example, the context framework manager 80 may act as an extension for the browser 86 to enhance capabilities of the browser 86 with respect to functioning to bring resources (e.g., information, data, content, etc.) to a user of the device employing the browser 86 (e.g., a user of the mobile terminal 10).

In an example embodiment, the context framework manager 80 is configured to execute the functions associated with application of the context framework 84 with respect to supporting the context resource description language used to enhance the browser's capability to provide information to the user. Thus, for example, when the browser 86 functions to parse content that is received (e.g., via HTML, XHTML or another markup language), the browser 86 may encounter context resource description language elements embedded within the content. The browser 86 may pass the encountered context resource description language elements to be passed on to the context framework manager 80. The context framework manager 80 may then apply the context framework 84 to the context resource description language elements to provide property management and provision of resources for a corresponding service. As such, the context framework 84 itself may define particular methods to be called or events to be used based on specific information provided in the context resource description language elements received.

In an example embodiment, the context resource description language provides a list of properties or resources that are associated with or needed by a particular web page or other service. The context resource description language of some examples also provides corresponding settings for each property that is required and, in some cases, also provides a textual description for each property to indicate, for example, reasoning for requesting the property or a rationale for why a particular requirement is made. The textual description may be provided to the user by the context framework manager 80 in some embodiments. The context framework manager 80 then takes responsibility for providing property management and service provision. As such, the context resource description language provides a relatively simple but powerful specification of information embedded within markup language based content received by the browser 86, for use in managing the properties or resources associated with or otherwise needed by a particular web page loaded by the browser 86.

In some cases, there may be multiple occurrences of context resource description language receipt by the browser 86 during a particular session or on a particular web page. As such, for example, context resource description language elements may be nested in some cases. Multiple occurrences of context resource description language elements within a page may sometimes occur when is written as following a state model. Because the model may be transaction based so that the model sets all requirements for the application and not the application itself, other applications may be prevented from setting anything else on the client.

In an example embodiment, in response to page loading, as indicated above, a context resource description language element associated with the page is passed on to the context framework 84. In some cases, the application (e.g., the browser 86) may pass the context resource description language element on using a state change such as, for example, an HTML on Load event. The application passing a reference to a context resource description language element or description of a page may do so by calling a corresponding method. By way of example, the method and various processes associated therewith will be referred to herein as context resource description language (CRDL) related methods or processes. However, it should be understood that the CRDL related methods and processes described herein are merely provided by way of example and the actual name and namespaces for the corresponding processes and methods may be flexible or may be standardized in any desirable naming convention. Thus, for example, a method processCRDL may be called by the application passing the reference to a context resource description language element on a page. The method processCRDL is described below: returnList processCRDL(STRING CRDLText);
The processCRDL may be provided either as a standard JavaScript library or as an extension to the window method based on the browser implementation that is implemented. The method takes the CRDL description as input parameter. In some cases, the interface may be blocking as this affects working of the entire web site.

```
Struct returnList{
Enumerated int StatusCode; //001 success, 002 partial success, 000 failure
String acceptedResourceListID; //id of the resource list that was accepted
ItemList acceptedPropertyList; //list of accepted properties if a partial
success was achieved
ItemRejectList rejectedPropertyList; //list of properties that were rejected
}
//Itemlist similar to DOM item interface
Interface ItemList{
Unsigned int index;
String propertyName getPropertyName(item);
}
Interface ItemRejectList{
Unsigned int index;
String propertyName getRejectedProperty(index);
String rejectCause getRejectCause(index);
}
```

In an example embodiment, tags may be defined within the context resource description language namespace. Examples of tags may include a resource list tag, a property tag, a minProcess tag, a mustPropertyList tag and an alt tag. These tags will be described in greater detail below. However, it should be appreciated that the particular names associated with these tags are not important and may be changed based on the naming convention adopted or otherwise desired for implementation of embodiments of the present invention. Accordingly, the function of the tags is more notable than the names assigned thereto. The tags may take the form provided below.

Tags:
<resourcelist> . . . </resourcelist>

In an example embodiment, the resourcelist tag forms the parent enclosure for all property tags. As such, in some cases, the resource list may include an unordered list of resources or properties that are required to perform a certain task. In some situations, a page may include only one resourcelist. However, a page may alternatively include many resource lists. For example, in situations in which the page is written to specify alternative content that could be used (e.g., the W3C DISelect or similar mechanisms). Tags may include various attributes that may define corresponding information associated with each respective tag. Attributes may include an identity (Id), a name, ontology, role and other information. The identity attribute may define a unique identifier for the corresponding tag to which the identity attribute is assigned. The identity attribute may be of a string type and may be used to identify resource lists within a page. The name attribute may define a name for the corresponding resource list. The ontology may provide information defining the ontology to which a corresponding resource list refers. When present as an attribute within the resourcelist tag, the ontology applies to all child properties in the resource list. In some cases, the child properties may each have an ontology attribute that may override the parent ontology attribute. Alternatively, an ontology tag may also be used instead of another attribute but the effect will be the same. The role attribute may be a required attribute in situations in which there is more than one resourcelist tag present within a context resource description language element. The role attribute may take one of two pre-defined string values including, for example, "primary" and "non-primary". The role attribute may determine resource list processing order. In other words, for example, the role attribute may determine whether a particular resourcelist is the first resourcelist to be processed or not. If the role attribute indicates "primary", then that particular resourcelist may take precedence and be the first resource list to be processed. If this resourcelist is enabled to be serviced, then no other resourcelist may necessarily be processed. Notably, although role attributes may be considered primary or non-primary in an example embodiment, in other embodiments, additional or alternative role attributes may be defined. Thus, there is no limit to the number of role attributes or the role values assigned to role attributes.

The property tag may take the form: <property> . . . </property>, and may define a single property. The property may enclose a plurality of child tags and the property tag itself may be enclosed within a resourcelist tag as indicated above. Some child tags are listed below along with a corresponding indication as to whether such child tags are optional or required for an example implementation. Child tags may include:

```
<name>: The name of the property : Required
<namespace>: the namespace of the property: Optional
<ontology>: the ontology to which the property belongs: Optional
<settings>: the settings list that is requested for this property. Optional
<description>: a textual description of why this property and a particular
setting is needed.
```

The settings list can be a list of settings attribute-value pairs and is property dependent. Meanwhile, the description tag may be a child tag of each setting or may be a child tag of the property tag. The description may used by the browser to display, to the user, an explanation for a setting that may be granted by the user.

As indicated above, minProcess tags may also be provided. These tags may take the form: <minProcess> . . . </minProcess>. The minProcess tag may provide a basic minimum number of properties within the propertylist that is to be approved in order to consider a particular resourcelist a success. In an example embodiment, the minProcess may be less than the number of <property> tags present within the resourcelist. However, in some cases, it may be a requirement that the minProcess be less than the number of <property> tags present within the resourcelist. The value defining the minProcess is typically an integer. In situations in which the minimum number specified is not reached, the context framework manager 80 may be configured to check to determine whether an alt tag is present to enable processing of another (e.g., alternate) resourcelist.

The mustPropertyList tag may take the form: <mustPropertyList> . . . </mustPropertyList>. If present, the mustPropertyList tag provides an unordered list of properties in which each listed property is enclosed within a <li> . . . </li> tag within the defined namespace. The <li> tag may provide a bag of properties denoting a corresponding approval of the properties for the propertylist that may be required for success. Otherwise, a failure may be returned or the alt tag, if present, may be processed.

The alt tag may take the form <alt> . . . </alt>. The alt tag may be a child tag within the <resourcelist> tag in some cases. The alt tag may instruct the context framework manager 80 to check an alternative <resourcelist> tag if the current resourcelist cannot be processed. The alt tag may also provide the identity or name of an alternative resourceslist to be processed as an attribute. In some cases, a restricted number of alt resoucelist designations may be permissible in order to restrict the available number of alternative tags that may be processed for a given context resource description language request to prevent a loop problem from occurring.

During an on Load event (or other event), the web application or browser 86 may request a certain set of properties with certain settings including an optional text description for each setting via the context framework manager 80. The context framework manager 80 may also perform a check to determine whether any permission (e.g., user permission) is needed in order to grant a particular setting by providing the textual description provided by the application. The user may verify requested settings based on the textual description provided by the application in some cases. However, in some implementations, an automated verification via automated text processing and comparison against requested settings may be implemented.

In a state based implementation, the context framework manager 80 may process one or more resourcelist based on whether access can be granted for a particular resourcelist. After the web application receives the response to the processCRDL call, the application may then determine whether the current content available is suitable or whether new content should be fetched from the server and the actions to be taken next in relation to the determination. In some embodiments, AJAX calls may be made to the server and the application may construct basic XML (extensible markup language) constructs of allowed resources either using a proprietary format or using something like CC/PP (composite capability/preference profile) or another format defined by OMA DPE (Open Mobile Alliance Device Profile Extension) or any other standard description language. In this way, the context framework 84 may support both OMA (e.g., involving transfer of data and proxy services) and W3C DDR (device repository) activity providing a full dynamic framework.

In cases in which a delivery context client interface (DCCI) API enables abstract nodes to be created and enables consumer applications to change property settings certain situations may be encountered. In this regard, for example, when tabbed browsing is allowed, a copy of each node per tab may be provided within the browser 86. It may be relatively unlikely that an instance of a provider is enabled to support multiple settings for a single property hosted within a single browser. Accordingly, in some embodiments, the context framework manager 80 may be configured to manage property settings that may be conflicting. For example, if a web application requests a mode in which GPS service updates are provided based on spatial changes and another web application requests a mode in which GPS updates are provided based on temporal changes, a conflict with respect to the property settings may be experienced. As such, the context framework manager 80 may be configured to deal with the conflict by only providing one mode of service based on precedence of the respective modes. The order of precedence may be defined by the provider and/or the user. Alternatively, an abstract node that is enabled to convert between the modes may be utilized in situations where such a node is present. The utilization of an abstract node to convert between modes may be subject to ontology checks and proper hierarchy implemented (e.g., both modes being derived from the base GPS property). In cases where the abstract node is used, the implementation may take care of atomicity between nodes.

Figure 3:
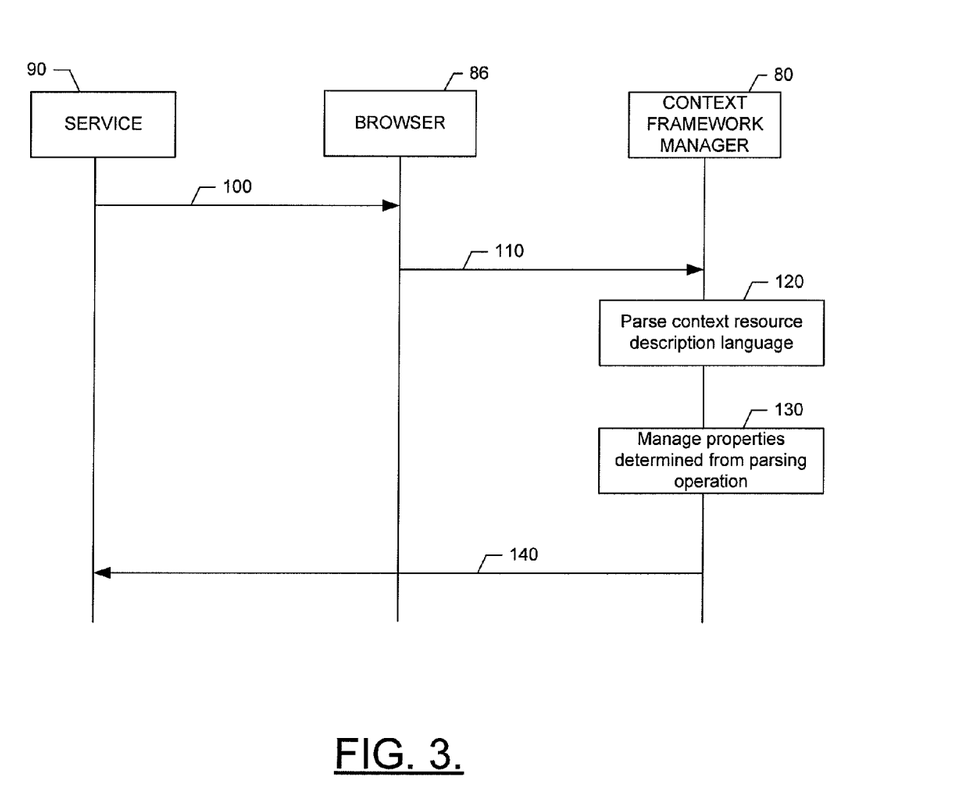
FIG. 3 is a flow diagram showing communication that may occur between different entities in an example embodiment of the present invention.

FIG. 3 illustrates a flow diagram showing communication that may occur between different entities in an example embodiment. In this regard, as shown in FIG. 3, the browser 86 may load a web page associated with a service 90 at operation 100. The web page may include context resource description language elements that may be passed from the browser to the context framework manager 80 at operation 110. The context framework manager 80 may parse the context resource description language to determine the resources or properties requested by the service 90 via the context framework 84 at operation 120. The parsing of the context framework manager 80 at operation 120 may also determine the settings for each property and, in some cases, a textual description for each property. The context framework manager 80 may then perform property management at operation 130 and provide the corresponding properties to the service at operation 140.

Figure 4:
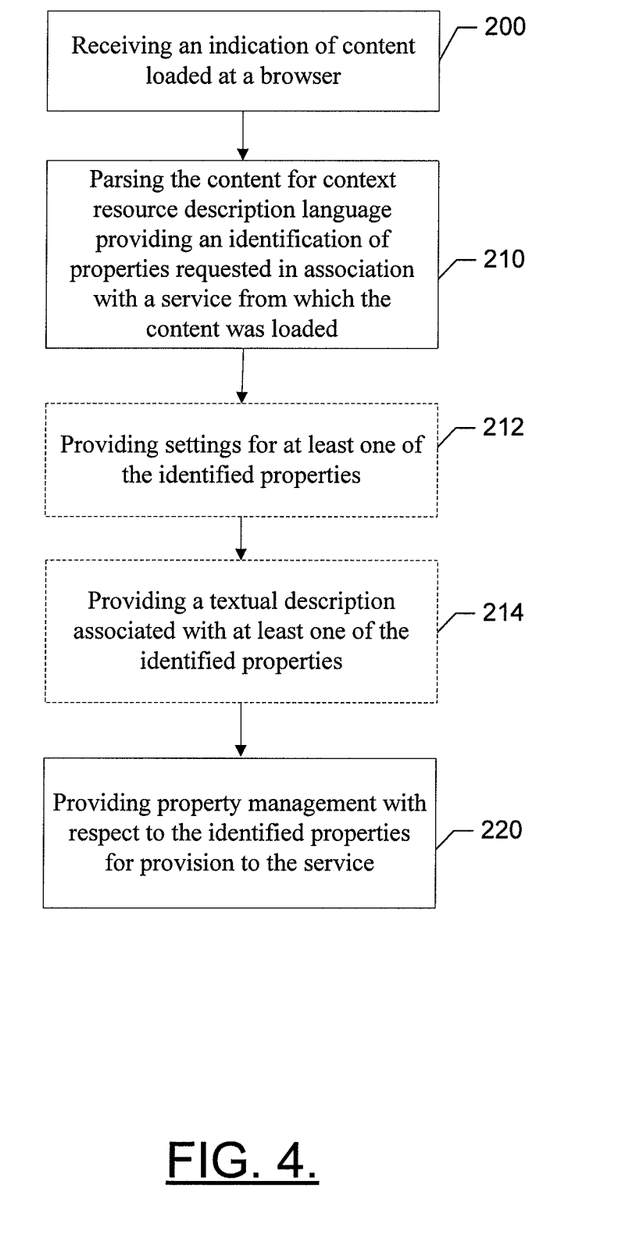
FIG. 4 is a block diagram according to an example method for providing a framework for supporting a context resource description language according to an example embodiment of the present invention.

FIG. 4 is a flowchart of a method and program product according to example embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving an indication of content loaded at a browser at operation 200 and parsing the content for context resource description language providing an identification of properties requested in association with a service from which the content was loaded at operation 210. The method may further include providing property management with respect to the identified properties for provision to the service at operation 220.

In some embodiments, certain ones of the operations above may be modified or further amplified as described below. Moreover, in some situations, the operations described above may be augmented with additional optional operations (some examples of which are shown in FIG. 4 in dashed lines). It should be appreciated that each of the modifications, augmentations or amplifications below may be included with the operations above either alone or in combination with any others among the features described herein. In an example embodiment, the method may further include providing settings for at least one of the identified properties at operation 212. Alternatively or additionally, the method may further include providing a textual description associated with at least one of the identified properties at operation 214. In such a situation, providing property management may include requesting user permission to grant a particular setting by providing the user with the textual description. Furthermore, in some cases, verification of permission regarding the particular setting may be received from the user. In an example embodiment, providing property management may include enabling the resolution of a conflict with respect to requested properties associated with different modes of service based on a predefined precedence of the respective different modes of service or via conversion between the respective different modes of service. In an alternative or additional example embodiment, providing property management may include indicating an inability to support the requested properties to facilitate retrieving alternative content.

In an example embodiment, an apparatus for performing the method of FIG. 4 above may comprise a processor (e.g., the processor 70) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the processor 70, the context framework manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code, the at least one memory and the computer program code configured to, with the at least one processor, cause the apparatus at least to at least:
receive an indication of markup language based content loaded at a browser;
parse the content loaded at the browser for a context resource request in a context resource description language that provides a specification of information embedded within the received content, wherein the information of said context resource request provides an identification of properties requested at the browser in association with a service operating on the apparatus from which the content was loaded at the browser; and
cause one or more of the requested properties to be managed on the apparatus with conflict resolution according to property settings and user permissions for provision to the service.

2. The apparatus of claim 1, wherein the at least one memory and the computer program code are further configured to, with the at least one processor, cause the apparatus to provide settings for at least one of the identified properties.

3. The apparatus of claim 1, wherein the at least one memory and the computer program code are further configured to, with the at least one processor, cause the apparatus to enable the resolution of a conflict with respect to requested properties associated with different modes of service based on a predefined precedence of the respective different modes of service.

4. The apparatus of claim 1, wherein the at least one memory and the computer program code are further configured to, with the at least one processor, cause the apparatus to enable the resolution of a conflict with respect to requested properties associated with different modes of service via conversion between the respective different modes of service.

5. The apparatus of claim 1, wherein the at least one memory and the computer program code are further configured to, with the at least one processor, cause the apparatus to provide a textual description associated with at least one of the identified properties.

6. The apparatus of claim 5, wherein the at least one memory and the computer program code are further configured to, with the at least one processor, cause the apparatus to request user permission to grant a particular setting by providing the user with the textual description.

7. The apparatus of claim 6, wherein the at least one memory and the computer program code are further configured to, with the at least one processor, cause the apparatus to receive verification of permission regarding the particular setting from the user.

8. The apparatus of claim 1, wherein the at least one memory and the computer program code are further configured to, with the at least one processor, cause the apparatus to cause a property to be managed on the apparatus by indicating an inability to support the requested properties to facilitate retrieving alternative content.

9. A method comprising:
receiving an indication of markup language based content loaded at a browser operating on a mobile terminal;
parsing, via a processor, the content loaded at the browser for a context resource request in a context resource description language that provides a specification of information embedded within the received content, wherein the information of said context resource request provides an identification of properties requested in association with a service operating on the mobile terminal from which the content was loaded at the browser; and
causing one or more of the requested properties to be managed with conflict resolution according to property settings and user permissions for provision to the service.

10. The method of claim 9, further comprising providing settings for at least one of the identified properties.

11. The method of claim 9, wherein providing property management comprises enabling the resolution of a conflict with respect to requested properties associated with different modes of service based on a predefined precedence of the respective different modes of service.

12. The method of claim 9, wherein providing property management comprises enabling the resolution of a conflict with respect to requested properties associated with different modes of service via conversion between the respective different modes of service.

13. The method of claim 9, further comprising providing a textual description associated with at least one of the identified properties.

14. The method of claim 13, wherein providing property management further comprises requesting user permission to grant a particular setting by providing the user with the textual description.

15. The method of claim 14, wherein providing property management further comprises receiving verification of permission regarding the particular setting from the user.

16. The method of claim 9, wherein causing a property to be managed comprises indicating an inability to support the requested properties to facilitate retrieving alternative content.

17. A computer program product embedded within at least one computer-readable non-transitory storage medium having computer-executable program code instructions stored therein, the computer-executable program code instructions comprising:
program code instructions for receiving an indication of markup language based content loaded at a browser operating on a mobile terminal;
program code instructions for parsing the content for a context resource request in a context resource description language that provides a specification of information embedded within the received content, wherein the information of said context resource description language provides an identification of properties requested at the browser in association with a service operating on the mobile terminal from which the content was loaded; and
program code instructions for providing property management that cause one or more of the requested properties to be managed with conflict resolution according to property settings and user permissions for provision to the service.

18. The computer program product of claim 17, further comprising program code instructions for providing settings for at least one of the identified properties.

19. The computer program product of claim 17, further comprising program code instructions for providing a textual description associated with at least one of the identified properties.

20. The computer program product of claim 19, wherein program code instructions for causing a property to be managed further comprises instructions for requesting user permission to grant a particular setting by providing the user with the textual description.

* * * * *